Jan. 23, 1968 G. W. KING 3,365,706

PHOTO-OPTICAL DATA STORAGE AND RETRIEVAL SYSTEM
EMPLOYING ERROR DETECTION AND ERROR
LOCATION IDENTIFICATION COMPONENTS

Filed April 15, 1964 3 Sheets-Sheet 1

INVENTOR.
GILBERT W. KING
BY Stanley Belsky
ATTORNEY

Jan. 23, 1968 G. W. KING 3,365,706

PHOTO-OPTICAL DATA STORAGE AND RETRIEVAL SYSTEM
EMPLOYING ERROR DETECTION AND ERROR
LOCATION IDENTIFICATION COMPONENTS

Filed April 15, 1964 3 Sheets-Sheet 2

INVENTOR
GILBERT W. KING
BY Stanley Belsky
ATTORNEY

Jan. 23, 1968 G. W. KING 3,365,706

PHOTO-OPTICAL DATA STORAGE AND RETRIEVAL SYSTEM
EMPLOYING ERROR DETECTION AND ERROR
LOCATION IDENTIFICATION COMPONENTS

Filed April 15, 1964 3 Sheets-Sheet 3

INVENTOR.
GILBERT W. KING
BY Stanley Belsky
ATTORNEY 3,365,706

PHOTO-OPTICAL DATA STORAGE AND RETRIEVAL SYSTEM EMPLOYING ERROR DETECTION AND ERROR LOCATION IDENTIFICATION COMPONENTS

Gilbert W. King, 761 Boston Post Road, Weston, Mass. 02193

Filed Apr. 15, 1964, Ser. No. 359,970
9 Claims. (Cl. 340—173)

ABSTRACT OF THE DISCLOSURE

This disclosure relates to a photo-optical data storage and retrieval sytem having circuitry for recording and reading out digital information stored therein and additionally having circuitry for identifying the presence of erroneously recorded data and recording the location of such data upon the photosensitive storage medium.

This invention relates to a novel method and apparatus for digital data storage employing photographic storage techniques and yet capable of modification of the stored information. More particularly, the invention makes use of a photosensitive semiconductor material as the storage medium and thereby is capable of forming a readable latent image of the recorded data and then developing the image of the recorded data and then developing the image to provide a permanent record. Errors in recording can thus be corrected by checking the latent image prior to development.

In another embodiment of the invention a storage medium of the same type is irradiated with a test pattern which is then used to detect and record the position of flaws leading to recording errors. After erasure of the test pattern, this information can be used to avoid attempts to record information in these positions.

The invention is particularly applicable to high density optical digital data storage systems. Such systems employ photographic techniques to record binary coded information in the form of alternate light and dark areas on photosensitive surfaces of disks, drums or tapes. The light areas may be transparent and the dark areas absorptive or reflective. The presence of a light or dark area indicates a binary, zero or one. Alternatively, a light-dark sequence may indicate one digit, with the other digit indicated by a dark-light sequence. Information is retrieved from the recording medium by passing it through a light beam and thus scanning, by means of a photo detector on the opposite side of the medium, the succession of light and dark areas. Alternatively, one may employ the difference in reflectivity of light and dark areas.

Because of the high resolution of photosensitive materials and the extremely high resolution obtainable in a light beam, optical storage systems are ultimately capable of relatively high information densities. However, in practice, the density has been limited by the presence of imperfections in the recording medium, i.e. areas which do not faithfully reproduce the optical data transmitted thereto. A recording will be free from error if the medium has satisfactory characteristics over a substantial portion of the space occupied by each bit of information. This is not too difficult to accomplish with relatively low density recordings, since the imperfections in the medium then occupy substantially less space than a bit of information. However, if an extremely high information density is required, e.g. $10^6$ bits per square inch or greater, such imperfections may occupy substantial space as compared with a bit area, resulting in errors in recording or retrieving information.

Detection of imperfections is readily accomplished only by recording information on the storage medium and then reading it out to compare the retrieved information with the information photographically applied to the medium. However, with prior optical storage systems this is impractical because of the time required for development of the latent optical image to obtain the readable, i.e. visible, image. The source of the information to be recorded often cannot itself store the quantity of information developed between the time the storage medium receives the information and the time when the information can be read from the medium.

Moreover, with prior systems the recorded data cannot be erased and then replaced by new information. Therefore, testing of the medium must be accomplished by attempting to record in actual use and then checking the recorded data.

Accordingly, a principal object of the present invention is to provide a method and apparatus for optical storage of data capable of a high information density and yet characterized by a low error probability.

Another object of the invention is to provide a method and apparatus for optical storage of data in which the information storing areas of their recording medium are substantially free of error-causing aberrations.

A further object of the invention is to provide a method and apparatus of the above character capable of making use of nondestructive testing of the recording medium after data are recorded thereon. The term "nondestructive" relates to the medium and not to the recorded information. That is, it is desired that the recording medium remain optically sensitve even after being tested by the recording and readout of information thereon.

Yet another object of the invention is to provide a method and apparatus of the above character capable of high speed operation.

Other objects of the invention will in part be obvious and will in part appear hereinafter.

The invention accordingly comprises the several steps and the relation of one or more of such steps with respect to each of the others, and the apparatus embodying the features of construction, combinations of elements and arrangements of parts which are adapted to effect such steps, all is exemplified in the following detailed disclosure, and the scope of the invention will be indicated in the claims.

For a fuller understanding of the nature and objects of the invention, reference should be had to the following detailed description taken in connection with the accompanying drawings, in which.

Figure 1:
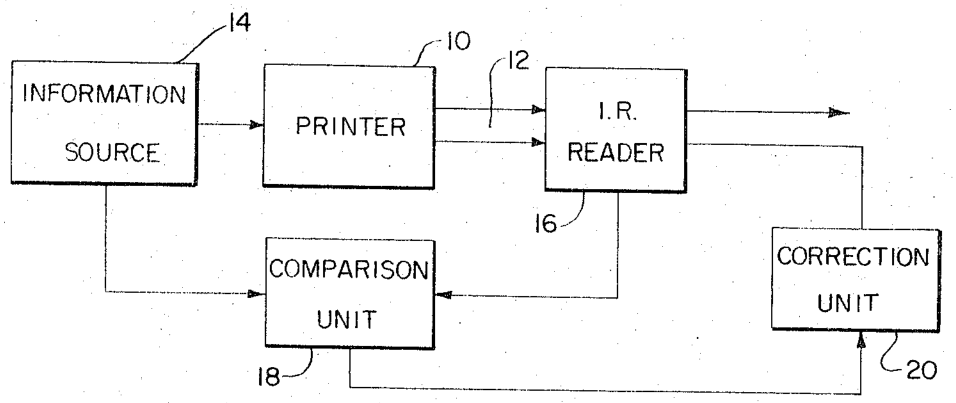
FIG. 1 is a generalized schematic diagram of an optical data storage system embodying the invention.

In general, the invention makes use of the photoconductive properties of certain materials sensitive to radiation. If such a medium is illuminated with a radiation pattern, a "latent image" of the pattern is thus imprinted on the surface of the medium in the form of chemically reactive areas. These areas are capable of taking part in chemical reactions resulting in the deposition of metal thereon to form a more permanent image.

Of particular interest in connection with the present invention is the fact that prior to development of the medium to form a permanent image, the latent image can be scanned by means of an infrared beam to check for the presence of recording errors. The reflectivity of the medium differs between the activated and non-activated areas of the record, i.e. between the light and dark areas of the recorded image. Accordingly, as information is recorded on a photosensitive disk used for this purpose, an immediate check can be made as to the accuracy of the recording and appropriate corrective action can be taken while the information source still retains that portion of the information.

Alternatively, one may make use of the fact that both the latent and the developed images on a photoconductive recording medium can readily be deleted without altering the photographic sensitivity of the medium. Therefore, prior to the ultimate use of a disk carrying a photoconductive medium, a test pattern may be recorded thereon. The recording may then be read to check it for accuracy. If errors are found, the disk may be discarded. On the other hand, the positions of the errors may be separately recorded, with the recording apparatus being programmed to avoid recording and reading at these positions. The test pattern may then be erased and the recording medium is then ready for use.

The commonly owned co-pending application of Berman et al., Ser. No. 199,211, filed May 14, 1962, the details of which are incorporated herein by reference, discloses recording media comprising photoconductive materials. Exposure of such a medium to activating radiation renders chemically reactive those portions of the medium which are struck by radiation thereby forming a latent image of the radiation pattern.

The activated medium is then contacted with a developer system to effect a chemical redox reaction, on such contact, between the developer system and the activated, chemically reactive portions of the medium. Thus, the exposed medium may be contacted with a solution containing ions of a metal such as copper, silver, mercury or gold. The ions are reduced to free metal on contact with the activated portions and the metal plates out onto these portions of the medium. For example, according to the teachings of the co-pending Berman application, a substrate filled or coated with a photoconductor such as titanium dioxide can be exposed and developed in this manner.

Although exposures can be used which are sufficient to cause precipitation of such an amount of metal ion to free metal as will form a visible image in the copy medium, shorter exposure times can also be used. The resulting invisible "latent developed images" can subsequently be amplified by contact with developer systems of a type known in the silver halide photographic arts, such as those comprising silver ion in admixture with a reagent forming a redox system such as hydroquinone. Developer systems of this type tend to deposit further free metal on a surface where free metal is already present. They can be used in the present invention to amplify a prior formed "latent developed image" or, alternatively, they can be used alone in a single developing step to form a visible image directly.

While the invention is not limited to any particular material, materials having the requisite photoconductive properties include Ge, BN, $TiO_2$, ZnO, $ZrO_2$, $GeO_2$, $In_2O_3$, $K_2Al_6Si_6O_{22}.2H_2O$, $SnO_2$, $Bi_2O_3$, PbO, BeO, $Sb_2O_5$, $SiO_2$, $BaTiO_3$, $Ta_2O_5$, $TeO_2$, $B_2O_3$, ZnS, and $SnS_2$.

With reference to FIG. 1 the preferred form of the invention makes use of a printer 10 which prints on an optically sensitive disk 12 digital data received from an information source 14. By way of example, the source 14 may be a high speed electronic digital data processing machine. The printer may print by means of a beam radiation, e.g. light, electrons, etc.

The disk 12, now carrying a latent image, corresponding to information from the source 14, is immediately read by an infrared reader 16. The output of the reader 16 is compared in a comparison unit 18 with the information just previously supplied to the printer 10 by the source 14. That is, the information which the comparison unit 18 receives from the source 14 is that information which the system has attempted to print in the positions on the disk 12 from which the reader 16 is supplying data. Whenever the comparison unit detects a difference in the information from its two input sources, it transmits a signal to a correction unit 20. The correction unit takes appropriate corrective action, as detailed below, prior to development of the disk in a developer 22.

Figure 3:
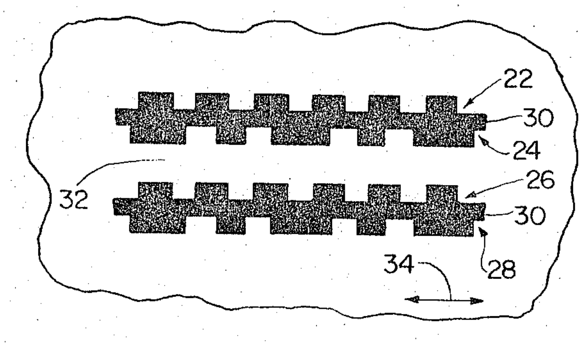
FIG. 3 illustrates a possible arrangement of recorded information for use with the present invention.

FIG. 3 shows the manner in which data may be recorded on the disk 12 of FIG. 1. A multiple track system is used, with a series of parallel circular tracks extending around the disk. Fragments of four of these tracks indicated generally at 22, 24, 26 and 28 are shown in FIG. 3. Each track comprises a series of successive opaque squares and transparent or translucent squares. By way of example, the binary "zero" may be represented by a translucent square followed by an opaque square. A binary "one" is the reverse. A system of this type is described in U.S. Patent No. 2,843,841 and therefore the details need not be printed here, although certain features of significance with regard to the present invention will be discussed. In any case, it should be understood that the invention is not limited to any particular arrangement of optically recorded data.

With further reference to FIG. 3, the tracks are arranged in pairs 22–24 and 26–28, with the tracks in each pair being separated by an opaque strip 30. The pairs of tracks are separated from each other by translucent strips 32.

The opaque strips or bands 30 may, if desired, be photographically printed on the disk 12 before use of the tape to record information. This may be accomplished by exposing the areas covered by the strips 30 to activating radiation to form latent images of the strips. These are then developed, as described above, to provide opaque metallic images forming the strips.

Figure 2:
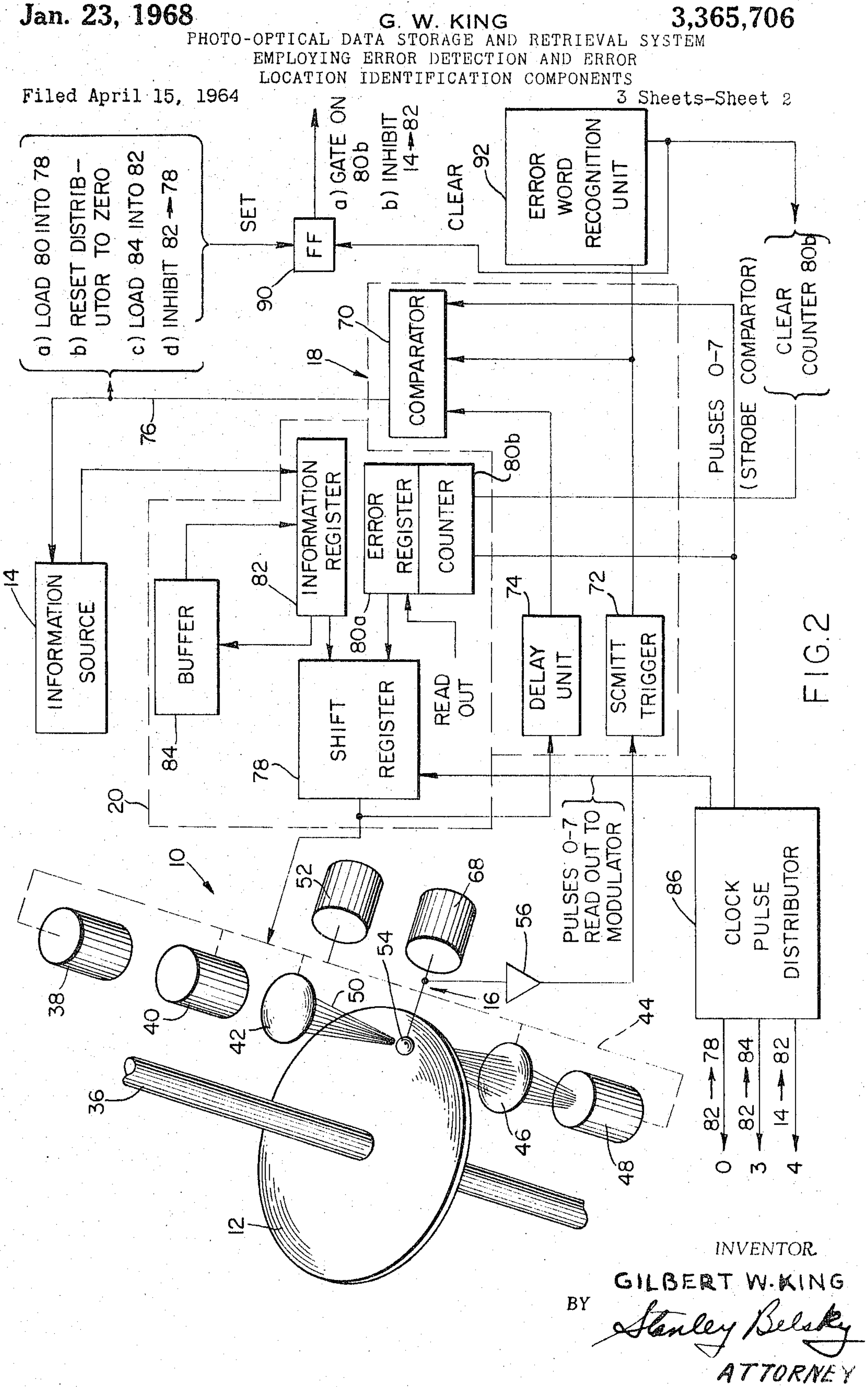
FIG. 2 is a more detailed schematic diagram of a preferred embodiment of the invention.

As shown in FIG. 2, the disk 12 is mounted for rotation on a shaft 36. The printer 10 is arranged to print on the disk 12, by means of a beam of light, tracks of the type illustrated in FIG. 3. For this purpose the printer comprises a light source 38 followed by a Kerr cell modulator 40 whose output is converged onto a small spot on the idsk 12 by a lens 42. These elements are mounted on a framework schematically shown at 44. Also supported by the framework on the opposite side of the disk 12 are a lens 46 and a photo detector 48. The latter two elements are used in a servo system which maintains the printer 10 in the correct radial position. The disk 12 is of a material which is transparent or translucent for the light from the source 38.

More specifically, the opaque bands 30 (FIG. 3) are preferably preprinted on the disk 12 as noted above. The light beam 50 is somewhat wider than the track it is to make and therefore it overlaps the opaque band adjacent to the track. Thus the opaque track masks out a portion of the beam which would otherwise pass through the disk 12 to the lens 46 and detector 48. The direct current output of the detector 48 is a function of the amount by which the beam overlaps the mask. A servosystem (not shown) operates a force motor 52 connected to the framework 44 to correctly position the printer 10, as indicated by a predetermined direct current output from the detector 48. A system of this type is disclosed in U.S. Patent 2,843,841 in which the deflection elements of a cathode ray tube are the equivalent of the motor 52. The printer 10 may be moved from track to track by the system disclosed in that patent.

As further shown in FIG. 2 the infrared reader 16 includes a reading head 54 whose output is amplified by an amplifier 56.

Figure 4:
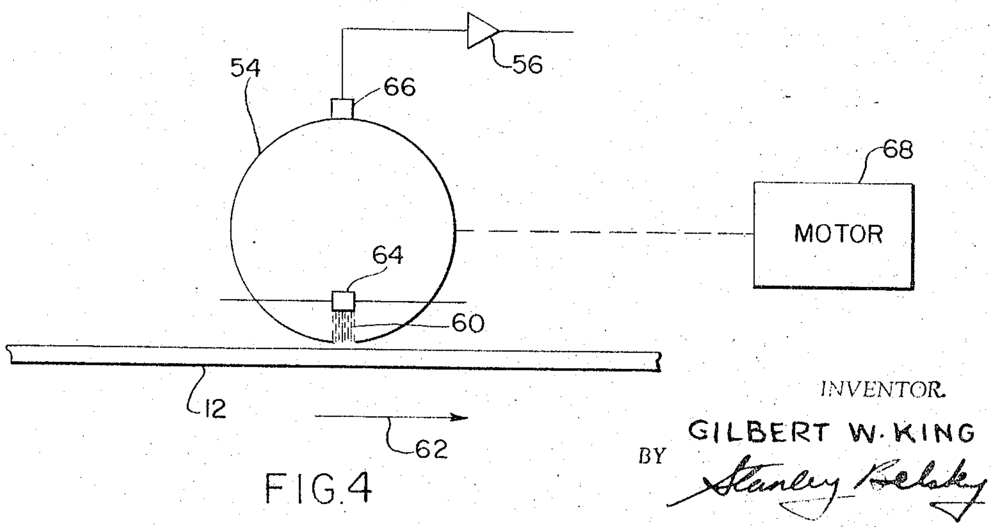
FIG. 4 is a simplified side view of a reader which may be used in the system of FIG. 2.

The reading head 54 is shown in detail in FIG. 4. A spherical integrator or Ulbricht sphere 58 is positioned closely adjacent to the disk 12 with a small aperture 60 opposite the disk. The aperture extends in the radial direction of the disk 12, i.e. the direction of the arrow 62, for a distance somewhat in excess of the width of an information track. Preferably its extent in the tangential direction, i.e. along the track, is substantially less than the length of one-half bit. That is, its extent in the tangential direction is substantially less than one of the dark or light areas printed by the printer 10.

Immediately above the aperture 60 is an injection laser 64 which emits a beam of infrared light through the aperture to the surface of the disk 12. The infrared is specularly reflected from the disk and most of the reflected light re-enters the integrator 58. The integrator equalizes the light flux over its inner surface so that the intensity at any point on the surface is proportional to the amount of light reflected from the disk 12. This intensity is converted into an electrical signal by a detector 66 connected to the amplifier 56. By way of example, the laser 64 may be a type GAE404, emitting at a wavelength of 0.9 micron. A laser of this type is marketed by Philco Radio Corporation. The detector 66 may then include a type S1 photomultiplier, marketed by Radio Corporation of America and sensitive in the region from 0.9 to 1 micron.

Assuming that the opaque bands 30 of FIG. 3 have a substantially different infrared reflectivity than the translucent or transparent bands 32, the reading head 54 can be positioned in the same manner as the printer 40. That is, the direct current output of the detector 66 of FIG. 4 will depend on how much the beam from the laser 64 overlaps each of the two bands on opposite sides of the track over which the head 54 is positioned. A servo system powers a motor 68 connected to the head 54 to provide the direct current output from the detector 66 corresponding to correct positioning of the reading head. Again, the motor 68 and the servosystem in which it is incorporated can be used in shifting the reader head 54 from track to track on the disk 12.

Returning to FIG. 2, the printer 10 prints an information track on the disk 12 by irradiating alternate segments of the track in accordance with signals from the information source 14. These irradiated segments are activated by the radiation, as described above, so that during subsequent development metal is deposited on them to the exclusion of the non-irradiated segments of the track. Immediately following irradiation by the printer 10 the activated portions of the track exhibit an infrared reflectivity which differs materially from that of the non-activated segments. As these segments pass from the printer 10 beneath the reader head 54, the head provides an electrical output which varies according to the reflectivity of the segments, i.e. whether or not they have been activated by the printer. The reader 16 thus provides an electrical output corresponding to the information actually recorded on the disk 12. This signal is compared with the information fed to the modulator 40, for printing, in order to check the accuracy of the recording and take appropriate correction action as necessary.

More specifically, as seen in FIG. 2, the comparison unit 18 comprises a comparator 70 connected to compare the outputs of a Schmitt trigger 72 and a delay unit 74 receiving the input signal of the modulator 40. The output of the trigger 72 is at either one of two levels, corresponding to a light or dark segment on the disk 12, depending on whether its input is above or below a threshold level. This threshold level is, for example, the level above which the output of the reader 16 will be if the reader head 54 is over a "light" segment; the output of the reader will be below the threshold level if a "dark" segment is beneath the reader head.

Thus the trigger 72 applies to the comparator 70 a signal indicating whether a light or dark area is being sensed by the reader 16. The comparator compares this signal with the signal applied to the modulator 40 at the time the segment being monitored by the reader passed through the reader 16. Thus, the delay imparted by the delay unit 74 equals the length of time it takes a segment to travel from the printer to the reader. When pulsed in a manner to be described, the comparator 70, which may take the form of a conventional AND circuit, emits an error signal on an output line 76 if the signals from the trigger 72 and delay unit 74 are not the same, i.e. if the recorded information does not correspond to the information which was to be recorded.

The correction unit 20 includes a shift register 78 operating also as part of the printer 10. The register 78 may be loaded either from an error register 80 or an information register 82. The information register 82 in turn is loaded from the information source 14. The register 82 and a buffer 84 are connected in a mutual exchange relationship so that information from the register can be loaded into the buffer and conversely information from the buffer can be loaded into the register.

The error register 80 comprises a fixed section 80A and a variable section 80B in the form of a counter. Thus the word stored in a register 80 may have a fixed prefix and a variable suffix. The prefix is a coded error signal which when recorded on the disk 12 in a manner to be described, indicates to a subsequent reader that there is an error in the preceding section. The variable suffix when recorded on the disc indicates successive errors in the successive recording of error signals.

The various operations of the comparison unit 18 and correction unit 20 are synchronized by means of a conventional clock pulse distributor 86. Connections between the various circuit units and the sources of the control signals have been omitted in order to clarify the information flow between these units. Moreover, a number of operations performed by the units include gating functions accomplished by gates which may be asumed to be incorporated in the units.

Printing is accomplished by transferring information from the source 14 first to the register 82 and then to the shift register 78. The output of an end stage of the register 78 is connected to the modulator 40. The shift register is connected to receive all the periodically spaced pulses from the distributor 86. Each of these pulses shifts the content of the register toward the end stage and thus the modulator 40 receives a series of signals corresponding to the content of the shift register. The number of pulses in each cycle of the distributor 86 is equal to the number of stages in the shift register 78 and for the purpose of the present description, this is taken as eight, i.e. pulses numbered 0–7, although in practice a substantially greater number may be used.

Thus, the content of the information register 82 is loaded into the shift register 78 on the zero pulse. This applies the first bit of the new word directly to the modulator 40 by means of the end stage of the shift register. The succeeding seven pulses from the distributor 86 shift the succeeding bits of this word to the modulator 40. In the meantime, pulse 3 causes the buffer 84 to acquire the content of the information register 82, which still retains the word previously transferred to the shift register 78. With this word now stored in the buffer 84, the register 82 is ready to receive the next new word from the information source 14 on the occurrence of clock pulse 4. When the next zero pulse occurs, the word stored in the register 82 is loaded into the shift register 78. Printing of that word then begins and the cycle is repeated.

The delay between the beginning of each distributor cycle and the changing of the content of the buffer 84, i.e. from the zero pulse to pulse number three, corresponds to the time it takes a segment of the printed track to pass from the printer 10 to the infrared reader 16. That is, the buffer 84 retains each word until its scanning by the reader 16 has been completed. After this has been accomplished there is no need to retain the word if it has been recorded without error, and the new word now being printed by the printer 10 may then be placed in the buffer.

The manner in which the system operates when an error is detected will be understood from the following example. Assume that there is an error in the bit which passes through the reader 16 just prior to the occurrence of clock pulse 2. The comparator 70 is gated on by each of the clock pulses and thus, when the number two pulse occurs, it delivers a signal to the output line 76 indicating a lack of correspondence between the output of the reader 16 and the delayed output of the shift register 78. This error signal on the line 76 performs several functions simultaneously. First, it causes the content of both sections 80*a* and 80*b* of the error register 80 to be transferred to the shift register 78, and the content of the buffer 84 to be transferred to the register 82. Secondly, it resets the distributor 86 to its zero pulse position, while at the same time inhibiting the transfer of information from the register 82 to the register 78. The error signal is also transmitted to the information source 14 so that the source can take appropriate action in accordance with the manner in which it is programmed. For example, it should delay the transmission of further information to the information register 82 during the short period required for corrective action.

The error signal also sets a flip-flop 90. The output of the flip-flop then inhibits the transfer of information from the information source 14 to the register 82 during the next clock pulse 4. Also, it causes the counter 80B to begin counting clock pulses from the distributor 86.

The distributor continues through its cycle until the error word in the register 80 has been printed.

The output of the Schmitt trigger 72 is also fed to an error word recognition unit 92. The unit 92 includes a shift register connected to a decoding circuit which emits a signal when the shift register contains in the proper position, the fixed prefix of the error word. It also contains a storage register to which the counter 80B content is transferred when the comparator 70 emits an error signal. The content of this storage register is compared with the content of the portion of the shift register of recognition unit 92 corresponding to the variable portion of the error words. When the correctly recorded prefix is detected by the decoding circuit and the content of the storage register equals the content of the variable portion of the shift register, the recognition unit 92 emits an output signal which indicates that the correct error word has in fact been printed.

Thus, the information read by the reader 16 is continually fed into the recognition unit 92 and the latter therefore emits a signal when the error word has been successfully printed on the disk 12. The signal from the unit 92 rests the flip-flop 90.

When the error word has been successfully printed, the next clock pulse zero operates in the normal manner to transfer to the shift register 78 the content of the register 82. This is the word which the system was attempting to print when the error occurred. Thus, a reader subsequently retrieving information from the disk 12 is warned by the error word of an error a predetermined number of bits preceding the beginning of this word. The error word also advises that the word which was interrupted is to be reprinted immediately following.

Should an error occur during the recording of the error word, the comparator will provide an error signal as before and this error signal will perform the same operations, with the exception of the setting of the flip-flop 90, inasmuch as the flip-flop has not yet been reset. The content of the register 80 will thus be transferred to the shift register 78. However, the error word now differs from its preceding content, since the counter 80B, instead of having a count of zero, contains the number of clock pulses which occurred since the preceding error signal. Upon subsequently retrieving information from the disk 12, a reader then uses the content of the counter 80B to determine where the error occurred. For example, let it be assumed that the system erroneously prints four error words successively and upon the fifth attempt correctly records an error word. The suffix of the correctly recorded error word will have a higher count than the counts in the suffix of the preceding error words owing to the accumulation of the count in 80*b*. The suffix of this correctly recorded error word will indicate to the reader that four unsuccesful attempts have been made to print the error word. Since an error word subtends a constant angle, this indicates to the reader where the original data error has occurred so that this erroneously recorded word may be corrected.

The counter 80B continues to count until the error word has been successfully printed, as indicated by the signal from the recognition unit 92 which resets the flip-flop 90. This stops counting by the counter 80B and also resets the counter to zero.

Figure 5:
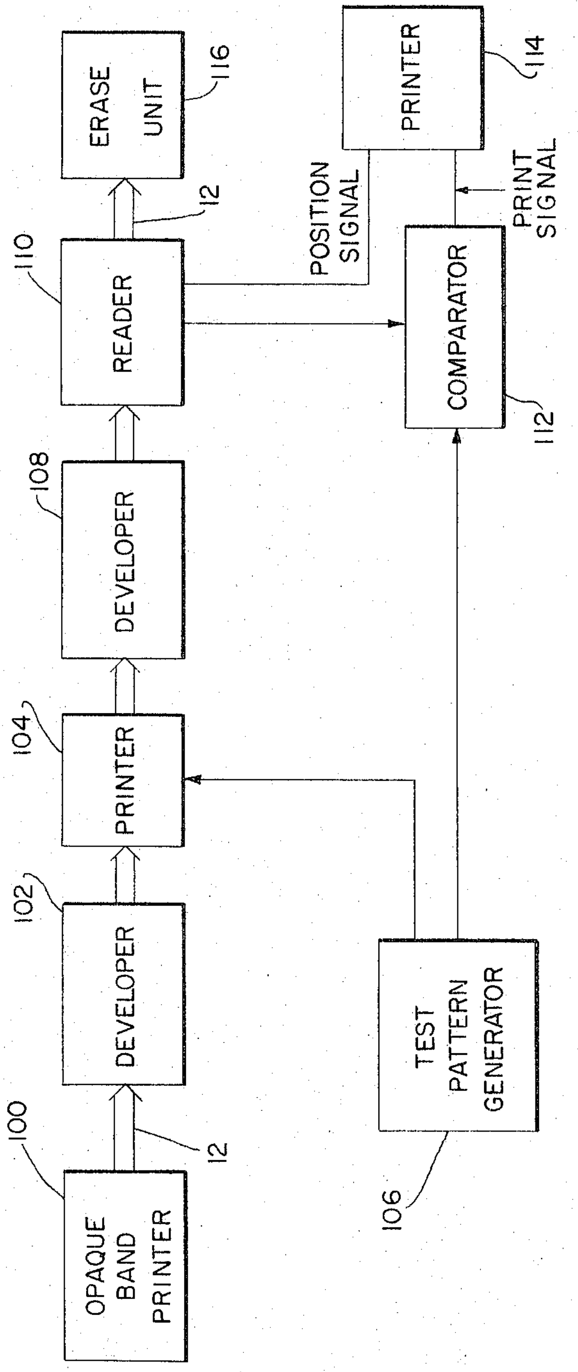
FIG. 5 illustrates in schematic form a modified arrangement for the testing of an optical data recording medium in accordance with the invention.

In FIG. 5 I have illustrated another embodiment of the invention in which the disk 12 is checked for defects therein prior to its ultimate use in recording information. Preferably, the opaque bands 30 are preprinted on the disk by a printer 100. It is also desirable that the printer 100 print suitable signals indicating the beginnings and ends of the information tracks. Next the image applied by the printer 100 is developed by a developer 102. The developer 102 is followed by a printer 104, similar to the printer 10 of FIG. 2, which prints a test pattern developed by a test pattern generator 106.

The disk 12 is then passed through a developer 108 to provide a visible image of the test pattern and this image is then read by an optical reader 110. The output of the reader 110 is fed to a comparator 112. The other input of the comparator is from the generator 106, which is recycled to run in synchroism with rotation of the disk in the reader 110. The reader also develops a signal indicative of its position on the disk at any time. This signal may be a number whose constituent parts indicate (1) the track being scanned and (2) the number of bits traversed from the beginning of the track. Whenever the comparator finds a disparity between the outputs of the reader and the generator 106, it supplies a print signal to a printer 114. The printer 114 thereupon prints the position indicated by the reader 110.

After the disk 12 has been completely scanned by the reader 110, the record provided by the printer 114 indicates the positions of all the defects on the surface of the disk. This record may then be used by the system ultimately recording information on the disk to avoid printing on these portions of the disk and also to print appropriate skip signals so that a later reader can skip over these spots.

The disk is then passed through an erase unit 116 which erases the test pattern therefrom. This may be accomplished by a differential etching of the metal forming the test pattern and the metal forming the bands and track end signals printed by the printer 100. Specifically, the developer 102 may form images by means of gold salts, with the developer 108 using silver. The silver can then be removed by a chemical reaction which does not affect the gold. At the same time, the removal of the silver test pattern image does not change the sensitivity of the underlying photoconductive medium for the future reception of photographic images.

It will be apparent that there are a number of variations of the above system within the scope of the present invention. For example, a portion of the disk 12 may be printed on the printer 10, and the resulting image then developed for use in an optical reader. Later, additional information may be printed on the unused portions of the disk. Conversely, if the entire disk is filled with information, a portion of the information can be removed by removing the metal forming that part of the recorded image. This portion can then be reprinted with new information.

As a combination of these two methods, the bands 30 may be developed with gold. Permanent information may next be printed and developed with gold. Finally, temporary informaiton may be printed and developed with silver. The temporary information can then be selectively removed and then replaced by reprinting.

It should be noted that the form of the recording medium is immaterial to the invention, although disks are generally to be preferred. For example, drums or tapes may be used.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

1. Data recording apparatus comprising
(A) an image-forming photoconductive recording medium of the type that is rendered chemically reactive by radiation,
(B) a printer
(1) responsive to a data signal and
(2) applying to said recording medium a radiation image of said signal, thereby to form a chemically reactive latent image of said data signal on said medium,
(C) reading means
(1) illuminating said latent image with infrared radiation, and
(2) developing a reading signal by means of said radiation indicative of the information in said latent image,
(D) means comparing said reading signal with said data signal and providing an indication of lack of identity of said signals, and
(E) error signal means causing said printer to print an eror signal on said medium in response to said comparing means indication.

2. The data recording apparatus defined in claim 1 in which said recording medium is a photoconductor itself sufficient as the photosensitive component of said medium.

3. The data recording apparatus defined in claim 2 in which said photoconductor is titanium dioxide.

4. The combination defined in claim 1 in which said error signal means causes said printer to print information relating to the location on said medium of the recorded information lacking identity to the data signal corresponding thereto.

5. The combination defined in claim 4 in which said error signal means includes means for generating an error signal having
(A) a fixed portion identifying the occurrence of an error, and
(B) a variable portion related to the location of said error.

6. Apparatus for optically recording digital data from an information source on a photoconductive, chemically activatable medium, said apparatus comprising
(A) a printer including
(1) a light source,
(2) means for converging a beam from said light source on a small area on said medium, and
(3) a modulator arranged to modulate the intensity of said beam according to said digital data, whereby said medium becomes chemically reactive with a pattern corresponding to the beam intensity,
(B) means for transportion said medium through said beam,
(C) means for serially applying to said modulator data signals from said information source,
(D) buffer means storing successive groups of digital data to be printed on said medium,
(E) an error register storing an error word,
(F) an infrared reader reading the chemically reactive latent image formed on said medium by said printer and providing a read signal in response thereto,
(G) comparing means
(1) comparing said read signal with the corresponding data signal applied to said modulator, and
(2) providing an error signal resulting from lack of identity of said read and data signals,
(H) means responsive to said error signal for
(1) applying the content of said error register to said data applying means, and
(2) applying the content of said buffer means to said data applying means after the printing of said error word.

7. The combination defined in claim 6 in which
(A) said error word has a fixed part and a variable part, and
(B) said variable part being related to the location on said medium corresponding to said lack of identity.

8. Optical data recording apparatus comprising
(A) a radiation sensitive recording medium of the type that forms a latent image corresponding to radiation incident thereon,
(B) a printer responsive to a data signal for irradiating said recording medium according to said data signal and thereby forming a latent image of said data signal on said medium,
(C) reading means developing a reading signal indicative of the information in said latent image, said reading means comprising
(1) a spherical integrator having an aperture,
(2) means positioning said integrator with said aperture closely adjacent the portion of said medium containing said image,
(3) an infrared light source disposed within said integrator and projecting a beam through said aperture to said medium, and
(4) means detecting the reflected radiation at a point on the inner surface of said integrator, the output of said detecting means being said reading signal,
(D) means comparing said reading signal with said data signal and providing an indication of lack of identity between them, and
(E) error signal means causing said printer to print an error signal on said medium in response to said indication.

9. The combination defined in claim 8 in which
(A) said medium is of a type which is rendered chemically active in areas exposed to a radiation pattern, thereby to form a latent image of said pattern, and
(B) said printer is arranged to form on said medium radiation patterns of the data to be printed.

References Cited

UNITED STATES PATENTS

| | | | |
|---|---|---|---|
| 2,680,200 | 6/1954 | Hercock | 250—83.3 |
| 2,843,841 | 7/1958 | King et al. | 340—173 |
| 2,922,106 | 1/1960 | Oates et al. | 340—174.1 |
| 2,937,368 | 5/1960 | Newby | 340—173 |
| 3,219,451 | 11/1965 | LuValle et al. | 340—173 |
| 3,307,157 | 2/1967 | Harper et al. | 340—173 |

BERNARD KONICK, *Primary Examiner.*

J. F. BREIMAYER, *Assistant Examiner.*